H. P. KOCHSMEIER & G. M. WALDORF.
SPRING HINGE.
No. 10,896. Reissued Jan. 31, 1888.
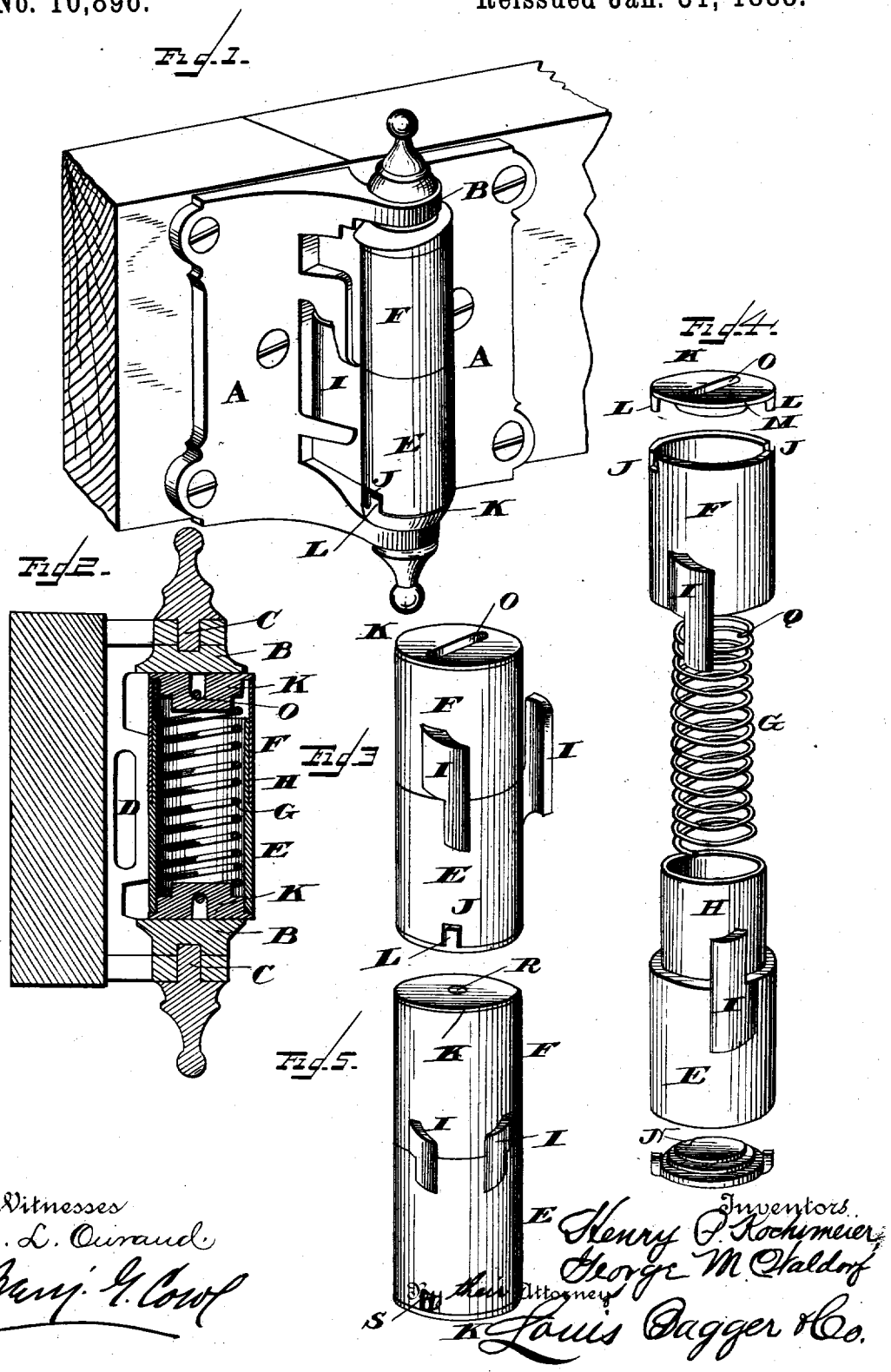
Witnesses
F. L. Ouirand
Benj. G. Cowl
Inventors
Henry P. Kochsmeier
George M. Waldorf
By their Attorneys
Louis Bagger & Co.
N. PETERS, Photo-Lithographer, Washington, D. C.

UNITED STATES PATENT OFFICE.

HENRY P. KOCHSMEIER AND GEORGE M. WALDORF, OF FREEPORT, ILLINOIS.

SPRING-HINGE.

SPECIFICATION forming part of Reissued Letters Patent No. 10,896, dated January 31, 1888.

Original No. 345,905, dated July 20, 1886. Application for reissue filed May 24, 1887. Serial No. 239,274.

*To all whom it may concern:*

Be it known that we, HENRY P. KOCHSMEIER and GEORGE M. WALDORF, both of Freeport, in the county of Stephenson and State of Illinois, have invented certain new and useful Improvements in Spring-Hinges; and we do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1 is a perspective view of our improved spring-hinge. Fig. 2 is a vertical sectional view of the same. Fig. 3 is a perspective detail view of the sleeves removed from the hinge. Fig. 4 is a similar view of the sleeves, the spring, and the buttons separated; and Fig. 5 is a view of the sleeves, showing a slight modification in the means for securing the spring and the buttons.

Similar letters of reference indicate corresponding parts in all the figures.

Our invention has relation to that class of spring-hinges in which the two leaves of the hinge are formed with obliquely-projecting ears at the upper and lower ends of their inner edges, which ears are pivoted together, and which springs, arranged axial to the pintles of the hinge, are secured to the inner edges of the leaves, drawing them together; and it consists, further, in the improved construction and combination of parts of such a hinge in which the spring is secured at its ends to two sleeves which surround the spring, and which turn upon each other, each sleeve, when used in connection with the leaves here shown, having a hook projecting from it, which engages an ear upon the inner edge of a leaf, all as hereinafter fully described and claimed.

In the accompanying drawings, the letters A A indicate the leaves of the hinge, which are provided at the ends of their inner edges with obliquely-projecting ears or lips B, which are pivoted together upon the pintles C, concentric to each other. The middles of the inner edges of the leaves are provided with wide slightly-outwardly-bent perforated ears or bails D, while otherwise the leaves are constructed similarly to the leaves of spring-hinges of this class. Two sleeves, E and F, inclose and completely cover the spring G, one sleeve, E, having a reduced inner portion, H, upon which the other sleeve turns, and the sleeves are provided at the inner meeting edges with outwardly-projecting wide hooks I, when designed to be used with the leaves here shown, the ends of which project beyond the edge of the other sleeve, and which hooks engage the wide bails upon the inner edges of the leaves of the hinge. The outer edges of the sleeves are provided with diametrically-opposite notches J, and caps K, or buttons, fit with their inner reduced ends into the ends of the sleeves, having lips or projections L from the inner faces of their flanged outer portions, M, which fit into the notches J and prevent the caps from turning within the ends of the sleeves. The reduced inner portions of the caps are formed each with a perforation, N, which extends into a transverse recess, O, in the outer face of the cap, and the inwardly-bent ends Q of the spring G fit into these perforations and recesses, and are retained in the same, keeping the caps in their positions in the ends of the sleeves. It will thus be seen that the spring and the caps will keep the sleeves together; and the caps fitting with their lips in the notches in the ends of the sleeves, the spring will be twisted when the sleeves are revolved upon each other, thus serving by its tension to draw the sleeves back into their original position, forcing the wide hooks toward each other. As these hooks are hooked into the ears at the middles of the inner edges of the hinge-leaves, the said inner edges will be drawn together in the same manner as in spring-hinges of a similar construction. After the leaves in opening have passed over the position in which they stand at right angles to each other, the spindle with the springs will be forced out from a line with the pintles of the hinge-ears, and the tension of the spring drawing upon the bails or ears of the leaves will tend to draw the leaves to stand in a position parallel with each other, so that after the door has been opened beyond a certain distance it will be drawn open by springs and held open by the springs.

If desired, the buttons or caps may be formed with a transverse groove, forming notches in the edges of the cap, into which groove the end of the spring may be placed; or the caps may be held together by means of an axial rivet, R, as shown in Fig. 5, while the ends of the spring are secured in notches S in the outer edges of the sleeves. It will thus be seen that the sleeves will serve as a casing for the spring, preventing any dust or dirt from entering into the spring and interfering with its operativeness, and at the same time the sleeves will serve as means for conveying the power of the twisted spring to the hinge-leaves, as well as for holding the spring straight, and the spring will hold all the parts of the spring mechanism of the hinge together, holding the caps together, which in their turn hold the sleeves together.

From the foregoing description, taken in connection with the accompanying drawings, the construction, operation, and advantages of our invention will be readily understood.

Our improved cover or casing for a double-acting spring adds greatly to the durability, utility, and appearance of the springs.

Having thus described our invention, what we claim, and desire to secure by Letters Patent of the United States, is—

1. In a spring-hinge, the combination of hinge-leaves having lugs upon their inner edges, and two sleeves turning with their inner ends upon each other, and having hooks projecting from their sides, overlapping said sleeves in opposite directions and adapted to engage said lugs, with a spring inclosed within the sleeves and secured to the outer ends thereof.

2. In a spring-hinge, the combination of hinge-leaves having lugs upon their inner edges, with two sleeves turning with their ends upon each other, and having hooks projecting from their sides, a spring inclosed within the sleeves, and caps secured to the ends of the spring and to the ends of the sleeves.

3. In a spring-hinge, the combination of hinge-leaves having lugs upon their inner edges, and two sleeves turning with their inner ends upon each other, and having hooks projecting from their sides and engaging with said lugs, with a spring inclosed within the sleeves and secured to the outer ends of the sleeves, as and for the purpose shown and set forth.

4. In a spring-hinge, the combination of hinge-leaves having lugs upon their inner edges, a sleeve having a reduced inner end, and having an outwardly-projecting hook at the shoulder, formed by the reduction, a sleeve turning with its inner end upon the reduced portion of the other sleeve, and having a hook projecting outwardly from its inner end, said hooks engaging with said lugs, and a spring inclosed within the sleeves and secured to their outer ends with its ends, as and for the purpose shown and set forth.

5. In a spring-hinge, the combination of hinge-leaves having lugs upon their inner edges, two sleeves turning with their inner ends upon each other, and having hooks projecting from their sides and engaging with said lugs, removable and adjustable caps secured to the outer ends of said sleeves, and a spring inclosed by said sleeves and having its ends secured to said caps, substantially as and for the purpose set forth.

6. The combination of hinge-leaves having lugs upon their inner edges, two sleeves turning with their inner ends upon each other, and having hooks projecting from their sides and engaging with said lugs, and having notches in their outer ends, caps formed with recesses and perforations fitting into the outer ends of the sleeves, and having lips to engage with said notches, and a spring inclosed within the sleeves and having its ends inserted into the perforations in said caps.

7. In a spring-hinge, the combination of two hinge-leaves having oblique ears at the ends of their inner edges pivoted together, and formed with wide perforated lugs or bails upon the middles of the inner edges, sleeves turning upon each other with their inner ends, and having wide hooks at their inner ends engaging said perforated lugs or bails, and a spring inclosed by the sleeves and having the ends thereof attached to said sleeves, as and for the purpose shown and set forth.

In testimony whereof we affix our signatures in presence of two witnesses.

HENRY P. KOCHSMEIER.
GEORGE M. WALDORF.

Witnesses:
W. N. CRONKENTE,
B. S. GRANSDEN.